United States Patent
Katsuka et al.

(10) Patent No.: US 6,581,001 B1
(45) Date of Patent: Jun. 17, 2003

(54) VEHICLE-MOUNTED NAVIGATION SYSTEM, AND RECORDING MEDIUM HAVING RECORDED THEREON A PROCESSING PROGRAM FOR USE THEREWITH

(75) Inventors: Keiichiro Katsuka, Shizuoka (JP); Takumi Suzuki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/686,811

(22) Filed: Oct. 12, 2000

(30) Foreign Application Priority Data

Oct. 14, 1999 (JP) .............................. 11-292536

(51) Int. Cl.⁷ .............................................. G01C 21/26
(52) U.S. Cl. ....................... 701/209; 701/201; 701/202; 701/204; 340/994
(58) Field of Search ................................ 701/200, 201, 701/202, 207, 208, 209, 210; 340/994, 988

(56) References Cited

U.S. PATENT DOCUMENTS

| | | | | |
|---|---|---|---|---|
| 5,724,243 A | * | 3/1998 | Westerlage et al. | 340/994 |
| 5,862,509 A | * | 1/1999 | Desai et al. | 701/209 |
| 5,931,888 A | * | 8/1999 | Hiyokawa | 701/208 |
| 5,987,377 A | * | 11/1999 | Westerlage et al. | 340/994 |
| 6,047,235 A | * | 4/2000 | Hiyokawa et al. | 340/988 |
| 6,134,500 A | * | 10/2000 | Tang et al. | 701/202 |
| 6,285,950 B1 | * | 9/2001 | Tanimoto | 340/994 |
| 6,351,707 B1 | * | 2/2002 | Ichikawa | 340/994 |

FOREIGN PATENT DOCUMENTS

| | | | |
|---|---|---|---|
| JP | 7-159191 | | 6/1995 |
| JP | 08077494 A | * | 3/1996 |
| JP | 10132591 A | * | 5/1998 |
| JP | 11201766 A | * | 7/1999 |

* cited by examiner

Primary Examiner—Jacques H. Louis-Jacques
(74) Attorney, Agent, or Firm—Morgan, Lewis & Bockius LLP (57) ABSTRACT

A vehicle-mounted navigation system (1) including: a route setting device (21) into which there are entered route setting information desired by a user, such as a starting location, a destination, and at least one en route point; a time setting device (22), which receives a scheduled time at which the vehicle is to depart from a starting location and a period of stopping at the at least one en route point, and which sets a departure time as a current time if no scheduled departure time is entered; a route retrieval device (23) which retrieves a route, to a destination, in accordance with the route setting information entered by the route setting device (21); and an arrival time computation device (24) which computes a time, at which the vehicle would arrive at the destination, on the basis of the route retrieved by the route retrieval device, and on the basis of the period of stopping and one of the scheduled departure time and the current time, entered to the time setting device (22).

12 Claims, 12 Drawing Sheets

VEHICLE-MOUNTED NAVIGATION SYSTEM, AND RECORDING MEDIUM HAVING RECORDED THEREON A PROCESSING PROGRAM FOR USE THEREWITH

BACKGROUND OF THE INVENTION

1. Field of the Invention

The present invention relates to a vehicle-mounted navigation system for guiding a vehicle to a destination. More particularly, the present invention relates to a vehicle-mounted navigation system which enables calculation of a precise arrival time even when a commercial vehicle travels to a destination by way of a number of en route points and which enables fast travel to a destination by way of en route points. Further, the present invention relates to a recording medium, such as a computer readable medium, having recorded thereon a processing program for use with the vehicle-mounted navigation system.

The present application is based on Japanese Patent Application No. Hei. 11-292536, which is incorporated herein by reference.

2. Description of the Related Art

Figure 10:
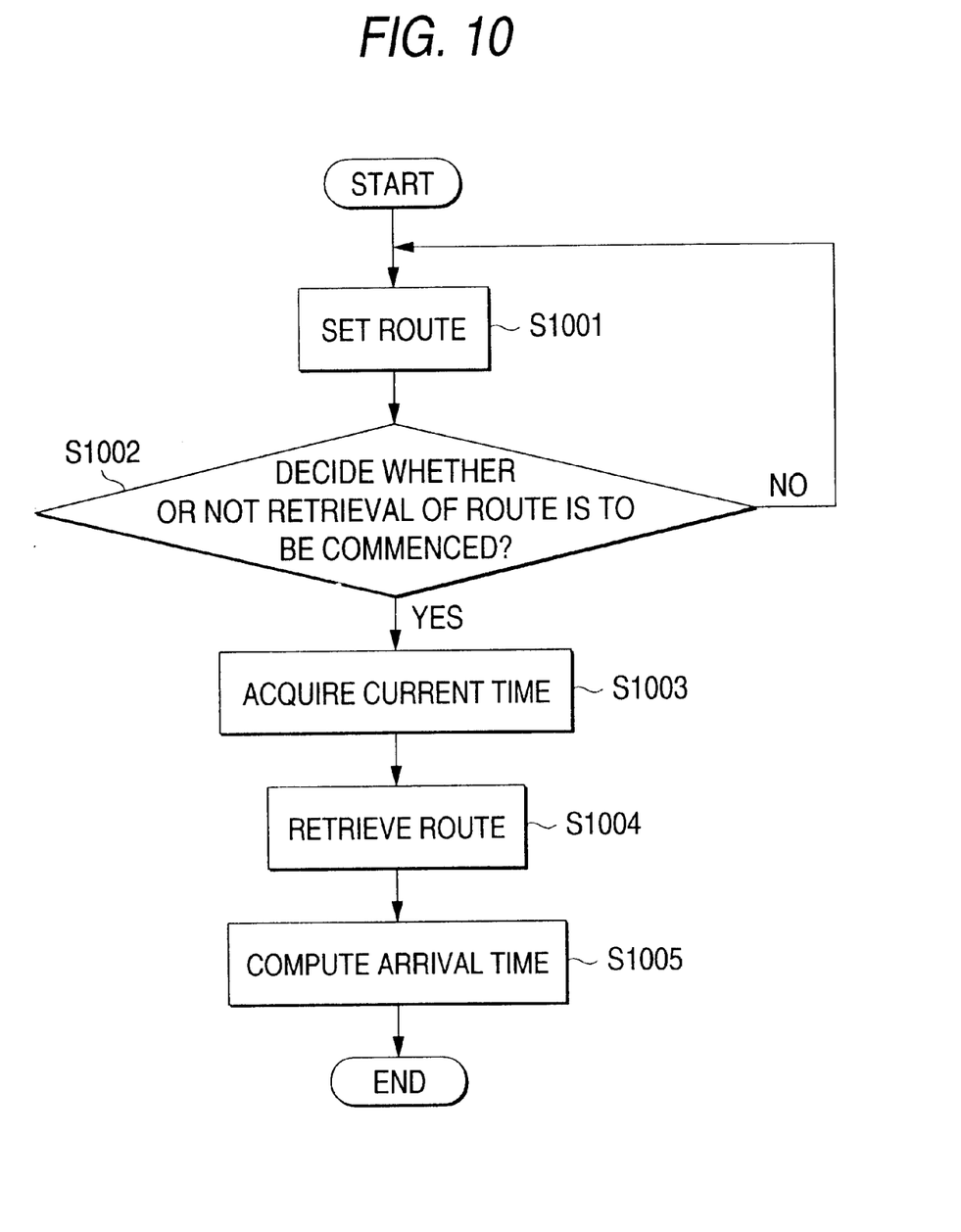
FIG. 10 is a flowchart for describing computation of an arrival time performed by a related vehicle-mounted navigation system.

In a case where a vehicle travels to a destination by way of number of en route points, a related vehicle-mounted navigation system (as developed by Yazaki corporation of Japan) computes an arrival time in accordance with a flowchart shown in FIG. 10.

As can be seen from the flowchart shown in FIG. 10, conventional computation of an arrival time involves a driver entering a start point, a destination, and en route points (S1001). At this time, a driver enters these items by utilizing a map or address search function or by selecting these items from a registration list and entering the selected items.

Figure 11:
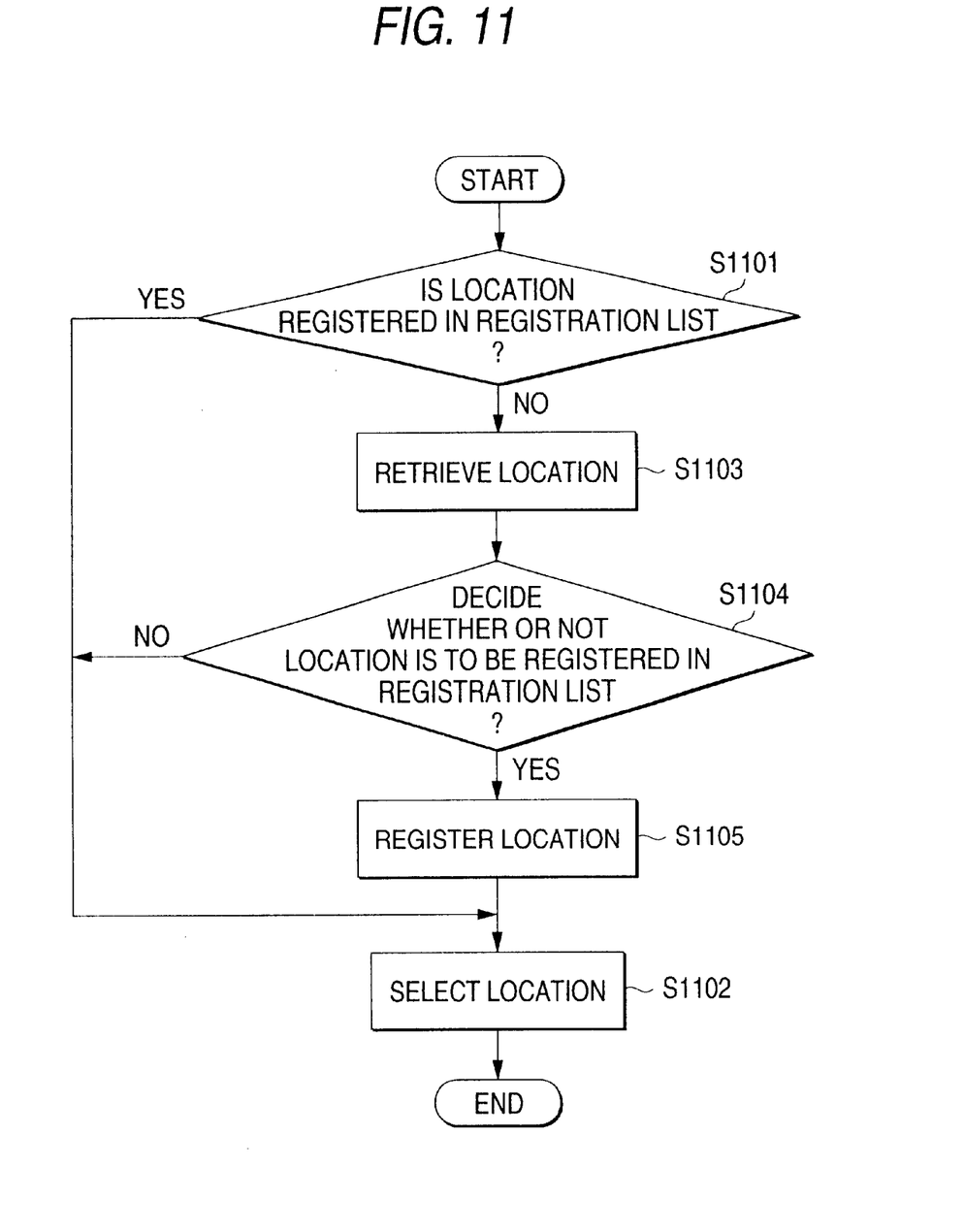
FIG. 11 is a flowchart for describing a setting operation performed by a related vehicle-mounted navigation system.

Entry (S1001) of a destination, i.e., a desired location, will now be described by reference to a flowchart shown in FIG. 11.

A determination is made as to whether or not a desired location is registered in a registration list (S1111). If the desired location is registered in the registration list, the desired location is selected from the registration list and entered (S1102). In contrast, if the desired location is not registered in the registration list, it is retrieved by utilizing a map or address search function (S1103). When the desired location is retrieved, a determination is made as to whether or not the location is to be registered in the registration list (S1104). If the location is to be registered, a registration operation is performed (S1105), and the driver selects the thus-registered location (S1102), wherewith entry of a desired location is finished. In contrast, if the location is not to be registered, the driver selects the location (S1102) without the system performing a registration operation (S1105), wherewith entry of the desired location is finished.

Turning again to the flowchart shown in FIG. 10, a destination and en route points are entered (S1001). At step 1002, it is decided whether or not to start retrieval of a route. If the thus-entered locations are correct, retrieval of a guide route is commenced (S1002). If one or more of the thus-entered points are incorrect, processing returns to step S1001, wherein a destination and en route points are re-entered. When retrieval of a guide route is commenced, the current time is determined (S1003). The guide route is then retrieved (S1004) and, subsequently, there is computed an arrival time (1005) at which a vehicle is to arrive after having started travel along the guide route from the thus-determined current time.

However, computation of an arrival time performed by the related vehicle-mounted navigation system does not allow entry of period of stopping at each of en route points. Therefore, when arrival time is computed, errors inevitably arise in the arrival time. Further, in a case where a vehicle does not depart at a current time, but is to depart several hours later, an error arises in a computed arrival time because the related vehicle-mounted navigation system does not allow for entry of a departure time. Therefore, when arrival time is thus computed, it is incorrect.

Figure 12:
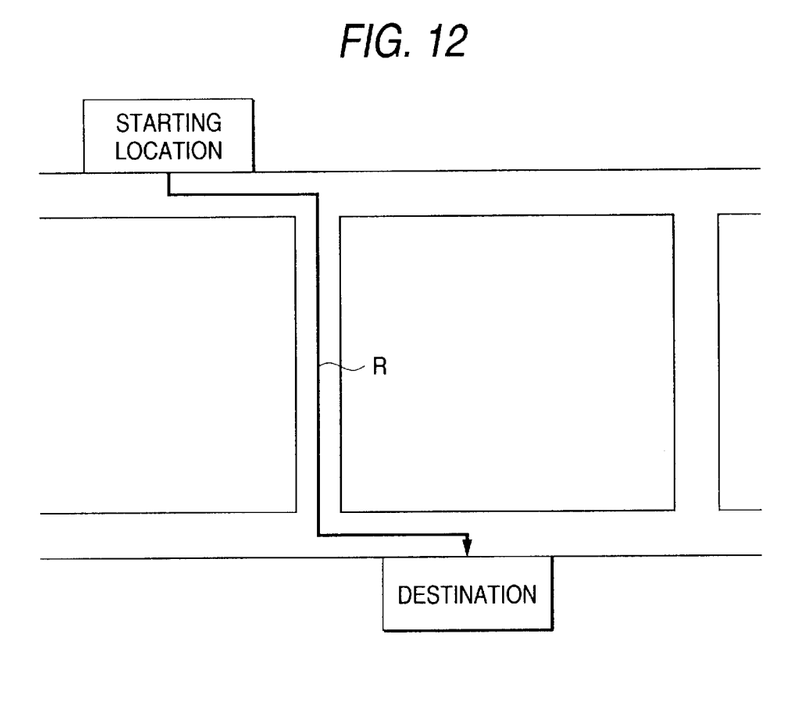
FIG. 12 is an illustration showing an example route retrieved by a related vehicle-mounted navigation system when parallel parking is not set.

In the related vehicle-mounted navigation system, the driver must enter a destination and an en route point. The driver retrieves a destination by retrieving such a destination from a registration list or by using a map or location retrieval function. Next, the driver retrieves the en route points by using a map or location retrieval function. The driver then enters the thus-retrieved destination and en route points. In connection with destinations which are frequently used, the destinations may be registered in a registration list. However, in connection with destinations which are less frequently used, registration of all such destinations is burdensome. Further, even in the case of a destination which has already been registered, a driver must retrieve the en route points again by using a map search function and must then enter the thus-retrieved locations. Therefore, wasteful iteration of operations is required, which results in low operation efficiency. A route retrieval function of a related vehicle-mounted navigation system (as developed by Yazaki corporation of Japan) searches for a route without taking into consideration a direction in which a vehicle approaches a destination or an en route point. There may arise a case where a destination is located on the right side with respect to the travel direction of a vehicle. In countries where vehicles travel on the left side, a median strip may hinder the vehicle's approach to the destination. Further, since a commercial vehicle requires loading or unloading of freight into or from the vehicle, the vehicle must be parked parallel to the destination. Even in the case of a road without a median strip, the vehicle must be parked on the left side with respect to the travel direction of the vehicle. However, in a case where a positional relationship shown in FIG. 12 exists between a starting location and a destination, the related vehicle-mounted navigation system retrieves a destination in preference to minimizing time and distance, as a result of which a route R is retrieved. Thus, the related vehicle-mounted navigation system is incapable of searching for a route such that a destination is located on the left side with respect to the travel direction of the vehicle.

The related vehicle-mounted navigation system has only a time-prioritized search function and a distance-prioritized search function so that it chooses a route which minimizes time and distance. Therefore, the related system cannot reflect a driver's desire in the route to be retrieved. For instance, every driver knows his own familiar roads which he uses everyday. However, the related vehicle-mounted navigation system searches for a route without taking into consideration such roads. Hence, even in a case where a driver desires to use his familiar road, a related vehicle-mounted navigation system (as developed by Yazaki corporation of Japan) encounters difficulty in retrieving such a road. Hence, if a driver desires to set a familiar route, he must perform a wasteful operation for setting an en route point.

Figure 13:
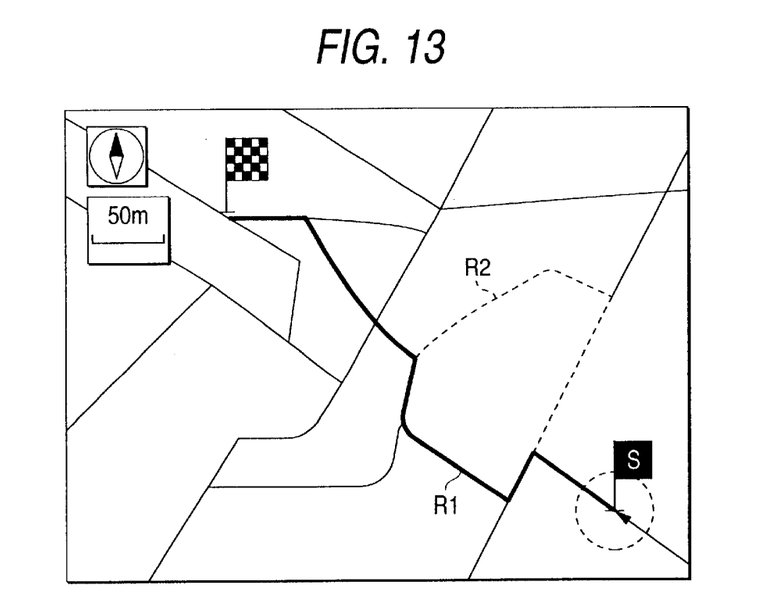
FIG. 13 is an illustration showing an example route retrieved by a related vehicle-mounted navigation system when a right-turn/left-turn preference is not set.

A commercial vehicle may have a large body. In such a case, a driver may desire to perform detailed settings in order to prohibit a U-turn, in order to decrease the number of turns, and in order to make right turns in preference to left turns. However, a related vehicle-mounted navigation system (as developed by Yazaki corporation of Japan) has only a retrieval function which prioritizes straight-ahead driving, and is incapable of performing a search in consideration of straight-ahead travel, right turns, left turns, and U-turns. Even when a driver desires to have right turns in preference to left turns—to make driving his large vehicle easier—the navigation system searches a route R1 which is shown in FIG. 13 and minimizes a distance to the destination. If another route R2 is taken, the number of left turns may be diminished. However, the related vehicle-mounted navigation system does not search such a route.

SUMMARY OF THE INVENTION

The present invention has been conceived in light of the foregoing background and is aimed at providing a vehicle-mounted navigation system which enables a commercial vehicle quickly to reach a destination by way of a plurality of en route points, and which enables a user's desire to be accounted for when retrieving a route. Further, the present invention is aimed at providing a recording medium, such as a computer readable medium, having recorded thereon a processing program for use with the navigation system.

To attain the foregoing and other objects, the present invention provides a vehicle-mounted navigation system which detects a current position of a vehicle and retrieves a route to a set destination, thereby guiding the vehicle along the route, the system including:

a route setting device into which there is entered route setting information desired by a user, said route setting information including a starting location, a destination, and an en route point;

a time setting device into which there are entered scheduled time at which the vehicle is to depart the starting location and a period of stopping at the en route point entered to the route setting device, wherein said time setting device sets departure time as a current time if the departure time is not entered; a route retrieval device which retrieves a route, to the destination, in accordance with the route setting information entered to the route setting device; and an arrival time computation device which computes the time, at which the vehicle is to arrive at the destination, on the basis of the route retrieved by the route retrieval device, and on the basis of the period of stopping and one of the scheduled departure time and the current time, entered to the time setting device.

According to the present invention, since an arrival time is computed by accounting for a scheduled departure time and scheduled periods of stopping at en route points, an accurate arrival time can be computed even when freight is loaded and unloaded into and from a vehicle at a number of en route points.

Preferably, the route setting device preserves locations which have been entered in the past as a location history list, and allows the user to select a starting location, a destination and an en route point from the location history list to thereby determine the starting location, the destination and the en route point.

According to the present invention, because locations which have been entered in the past are preserved in the history list, a location which is less frequently used can be selected from the history list without having to register the location in the registration list. Also, a location can be entered quickly without performing a burdensome retrieval operation, such as a map retrieval operation or a name retrieval operation.

Preferably, when selecting a route, the route setting device can account for a weight arbitrarily assigned to each of straight-ahead travel, a right turn, a left turn, and a U-turn.

According to the present invention, a weight to be assigned to each of straight-ahead travel, a right turn, a left turn, and a U-turn can be arbitrarily entered by the user in accordance with the user's desire.

Preferably, the route retrieval device preserves at least one route previously utilized by the user as a route history list, and retrieves a route by prioritizing the at least one route preserved in the route history list. That is, the route used most frequently is given the highest priority, the route used second-most frequently is given second-highest priority, and so on for all the routes in the history list.

According to the present invention, since a route with the highest priority—among those including the entered en route and/or destination points—is retrieved, a route satisfying the user's desire is retrieved. The user is thus guided to drive a vehicle along the road which the user uses everyday, thereby enabling the user to drive safely.

The present invention also provides a vehicle-mounted navigation system which detects a current position of a vehicle and retrieves a route to a set destination, thereby guiding the vehicle along the route, the system including:

a route setting device into which there is entered route setting information desired by a user, said route setting information including a starting location, a destination, an en route point, and at least one of a direction in which the vehicle is to approach the destination and a direction in which the vehicle is to approach the en route point; and a route retrieval device which retrieves a route to the destination on the basis of the route setting information entered to the route setting device such that the direction in which the vehicle is to approach at least one of the destination and the en route point matches an approach direction set by the user.

Accordingly, the present invention avoids a case wherein a median strip may hinder the vehicle's approach to a destination, or a case wherein a commercial vehicle may not be able to load or unload freight. Therefore, a commercial vehicle can arrive quickly at a destination by way of a number of en route points.

Preferably, in the case of left-side driving, the route retrieval device retrieves a route such that at least one of the destination and the en route point is situated on the left side of the vehicle when the vehicle approaches the destination or the en route point. Similarly, in the case of right-side driving, the route retrieval device retrieves a route such that at least one of the destination and the en route point is situated on the right side of the vehicle when the vehicle approaches the destination or the en route point.

Accordingly, the present invention avoids a case where, in the case of left-side driving, a commercial vehicle approaches a destination from a direction in which the destination is situated on the right side of the vehicle so as to prevent the loading or unloading of freight despite a necessity to do so. Alternatively, the present invention avoids a case where, in the case of right-side driving, a commercial vehicle approaches a destination from a direction in which the destination is situated on the left side of the vehicle so as to prevent the loading or unloading of freight despite a necessity to do so.

The present invention also provides a recording medium, such as a computer readable medium, having recorded thereon a processing program for use with a vehicle-mounted navigation system, which system detects a current position of a vehicle and retrieves a route to a set destination, thereby guiding the vehicle along the route, the program including:

a route setting operation for entering route setting information desired by a user, said route setting information including a starting location, a destination, and an en route point;

a time setting operation for entering a time at which the vehicle is scheduled to depart the starting location, and for entering a period of stopping at the en route point entered in the route setting operation, and for setting as a departure time a current time if the departure time is not entered;

a route retrieval operation for retrieving a route, to the destination, in accordance with the route setting information entered to the route setting operation; and an arrival time computation operation for computing the time, at which the vehicle is to arrive at the destination, on the basis of the route retrieved by the route retrieval operation and on the basis of the period of stopping and one of the scheduled departure time and the current time, entered in the time setting operation.

According to the present invention, the arrival time computation device computes an arrival time by accounting for a scheduled departure time and scheduled periods of stopping at en route points. Thus, even when the user loads or unloads freight into and from the vehicle at each of en route points, an accurate arrival time is computed.

Preferably, the route setting operation enables preservation of locations which have been entered in the past as a location history, and also enables selection of a starting location, a destination and an en route point from the location history list, to thereby allow easy selection of the starting location, the destination and the en route point.

According to the present invention, because locations which have been entered in the past are preserved in the history list, a location which is less frequently used can be selected from the history list without having to register the location in the registration list. A location thusly can be entered quickly without performing a burdensome retrieval operation, such as a map retrieval operation or a name retrieval operation.

Preferably, when selecting a route, the route setting operation accounts for assignment of an arbitrary weight to each of straight-ahead travel, a right turn, a left turn, and a U-turn.

According to the present invention, a weight to be assigned to each of straight-ahead travel, a right turn, a left turn, and a U-turn can be arbitrarily entered by the user in accordance with the user's desire.

Preferably, the route retrieval operation enables preservation of at least one route previously utilized by the user as a route history list and retrieves a route by prioritizing the at least one route preserved in the route history list. That is, the route used most frequently is given the highest priority, the route used secondmost frequently is given second-highest priority, and so on for all the routes in the history list.

According to the present invention, since a route with the highest priority—among those including the entered en route and/or destination points—is retrieved, a route satisfying the user's desire is retrieved. The user is thus guided to drive a vehicle along the road which the user uses everyday, thereby enabling the user to drive safely.

The present invention also provides a recording medium having recorded thereon a processing program for use with a vehicle-mounted navigation system, which system detects a current position of a vehicle and retrieves a route to a set destination, thereby guiding the vehicle along the route, the program including:

a route setting operation for entering route setting information desired by a user, said route setting information including a starting location, a destination, an en route point, and at least one of a direction in which the vehicle is to approach the destination and a direction in which the vehicle is to approach the en route point; and a route retrieval operation for retrieving a route to the destination on the basis of the route setting information entered in the route setting operation such that the direction in which the vehicle is to approach at least one of the destination and the en route point matches an approach direction set by the user.

Accordingly, the present invention avoids a case wherein a median strip may hinder the vehicle's approach to a destination, or avoids a case wherein a commercial vehicle may not be able to load or unload freight. Therefore, a commercial vehicle can arrive quickly at a destination by way of a number of en route points.

Preferably, in the case of left-side driving, the route retrieval operation enables retrieval of a route such that at least one of the destination and the en route point is situated on the left side of the vehicle when the vehicle approaches the destination or the en route point. Similarly, in the case of right-side driving, the route retrieval operation enables retrieval of a route such that at least one of the destination and the en route point is situated on the right side of the vehicle when the vehicle approaches the destination or the en route point.

Accordingly, the present invention avoids a case where, in the case of left-side driving, a commercial vehicle approaches a destination from a direction in which the destination is situated on the right side of the vehicle so as to prevent the loading or unloading of freight despite a necessity to do so. Alternatively, the present invention avoids a case where, in the case of right-side driving, a commercial vehicle approaches a destination from a direction in which the destination is situated on the left side of the vehicle so as to prevent the loading or unloading of freight despite a necessity to do so.

DETAILED DESCRIPTION OF THE PREFERRED EMBODIMENT

A vehicle-mounted navigation system and a recording medium, such as a computer readable medium, having recorded thereon a processing program for use with the navigation system according to embodiments of the present invention will be described hereinbelow by reference to the accompanying drawings.

Hardware configuration of the vehicle-mounted navigation system (hereinafter often referred to simply as a "navigation system") according to embodiments of the present invention will be described by reference to FIG. 1.

Figure 1:
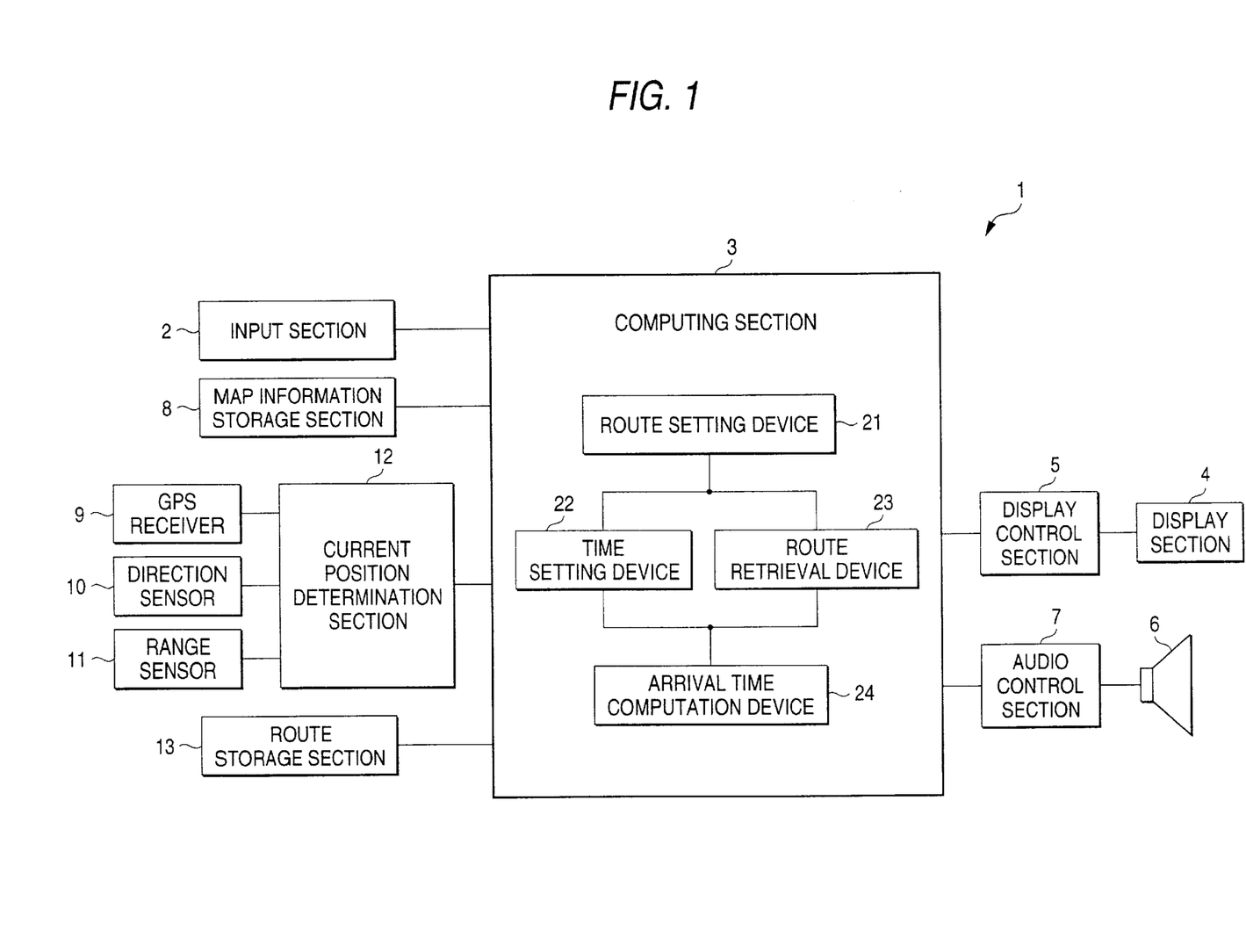
FIG. 1 is a block diagram showing the hardware configuration of a vehicle-mounted navigation system according to an embodiment of the present invention.

As shown in FIG. 1, a vehicle-mounted navigation system 1 according to an embodiment of the present invention includes an input section 2 for entering route setting information, such as a destination and en route points, and a driver's desire; a computing section 3 for controlling the entire system, for retrieving a route, and for computing an arrival time; a display control section 5 for displaying a route setting screen or a route guide screen on a display section 4; an audio control section 7 which converts audio data into an analog signal in accordance with a guide instruction output from the computing section 3 and outputs a guide voice by activating a loudspeaker 6; a map information storage section 8 in which are recorded navigation data required for computing a route and guide data required for guiding; a current position determination section 12 which determines the current position of a vehicle upon receipt of information from a GPS receiver 9, a direction sensor 10, and/or a range sensor 11; and a route storage section 13 for storing data pertaining to a route to a destination retrieved by the computing section 3.

The computing section 3 includes a route setting device 21 for setting a route in accordance with route setting information, such as a starting location, a destination, and en route points, entered by a vehicle's driver through use of the input section 2; a time setting device 22 for receiving a scheduled time at which the vehicle is to depart from a starting location and a period of stopping at each of the entered en route points, as well as for setting departure time to a current time if no scheduled departure time is entered; a route retrieval device 23 for retrieving a route to a destination in accordance with the route setting information entered by the route setting device 21; and an arrival time computation device 24 for computing a time, at which the vehicle is to arrive at the destination, on the basis of the scheduled departure time, the period of stopping at each of the en route points, and the current time entered by the time setting device 22.

The computing section 3 may be implemented on an ordinary computing system having a CPU for performing various processing operations and a storage device for storing processing instructions. Processing instructions and timing restrictions for the route setting device 21, those for the time setting device 22, those for the route retrieval device 23, and those for the arrival time computation device 24, are retained in the storage device. The processing instructions and timing restrictions are loaded to and executed by the CPU, as required.

Next will be described computation of an arrival time performed by the vehicle-mounted navigation system according to one embodiment, in accordance with the flowchart shown in FIG. 2.

When the driver enters, by use of the input section 2, route setting information required for setting a route, such as a destination and en route points, the route setting information is sent to the computing section 3 in which the route setting device 21 sets a route.

The route setting device 21, in response to the driver's input to input section 2, selects a starting location, en route points, and a destination from a registration list, and then sets the thus-selected items. Alternatively, the route setting device 21 may select these items from a history list and then set the thus-selected items.

Figure 3:
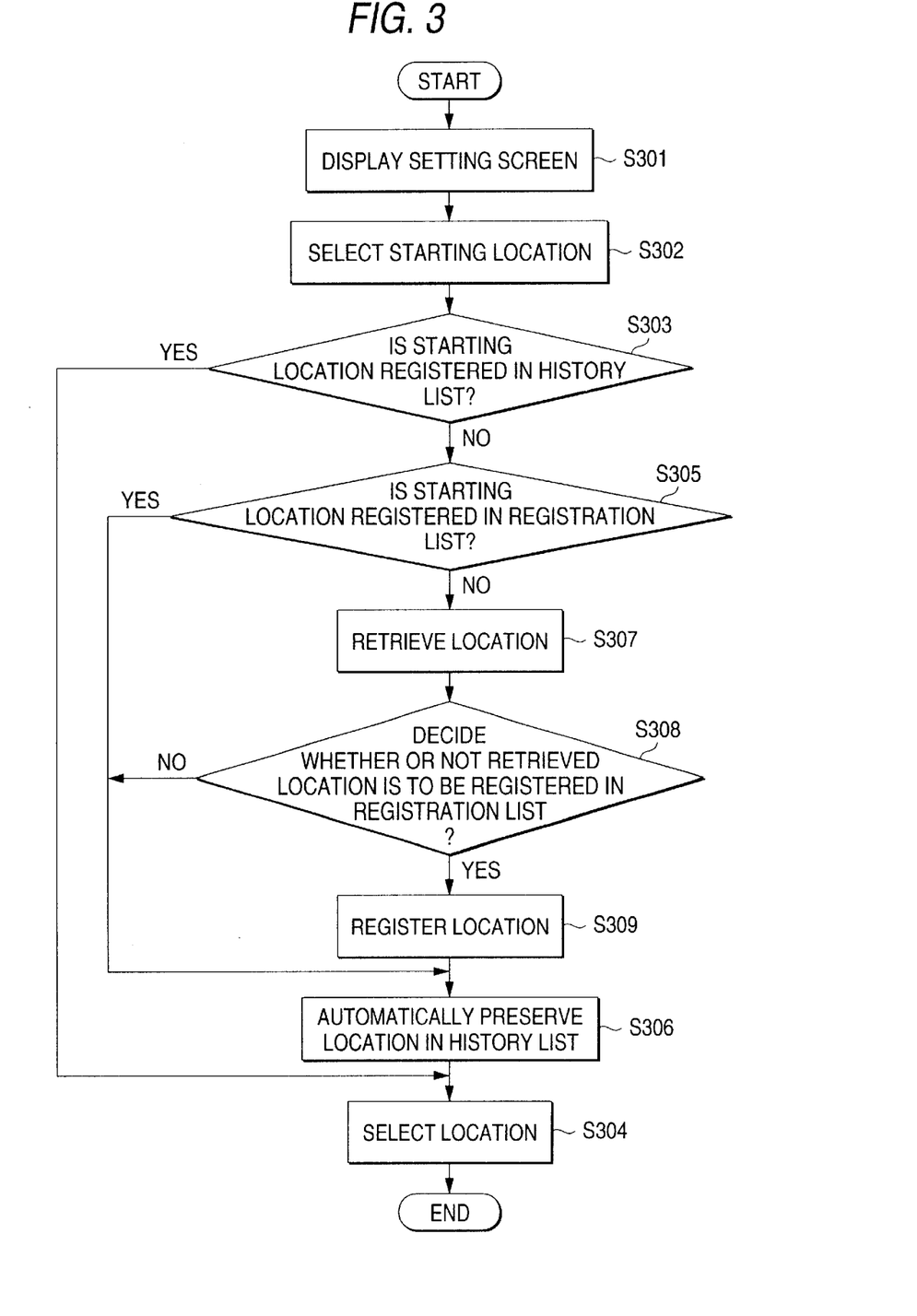
FIG. 3 is a flowchart for describing a setting operation of the navigation system shown in FIG. 1.

Entry of a destination by reference to a history list will now be described in accordance with a flowchart shown in FIG. 3.

Figure 4:
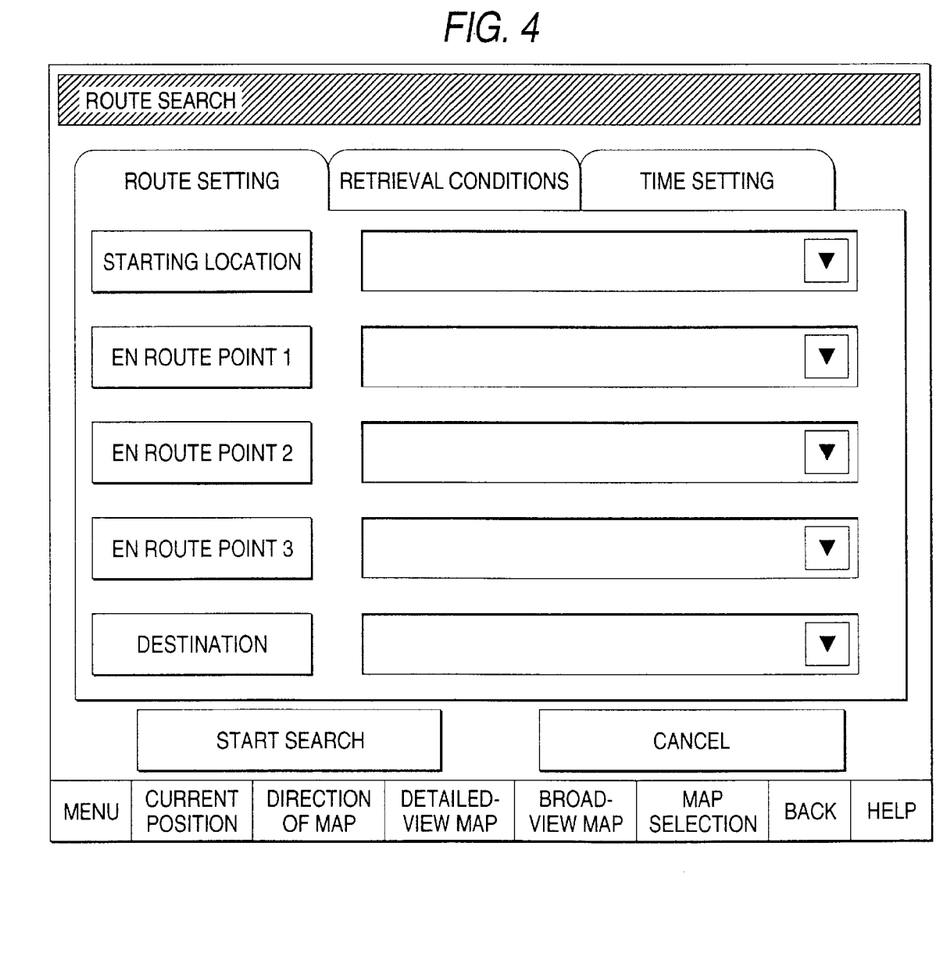
FIG. 4 is an illustration showing an example route setting screen of the navigation system shown in FIG. 1.
Figure 5:
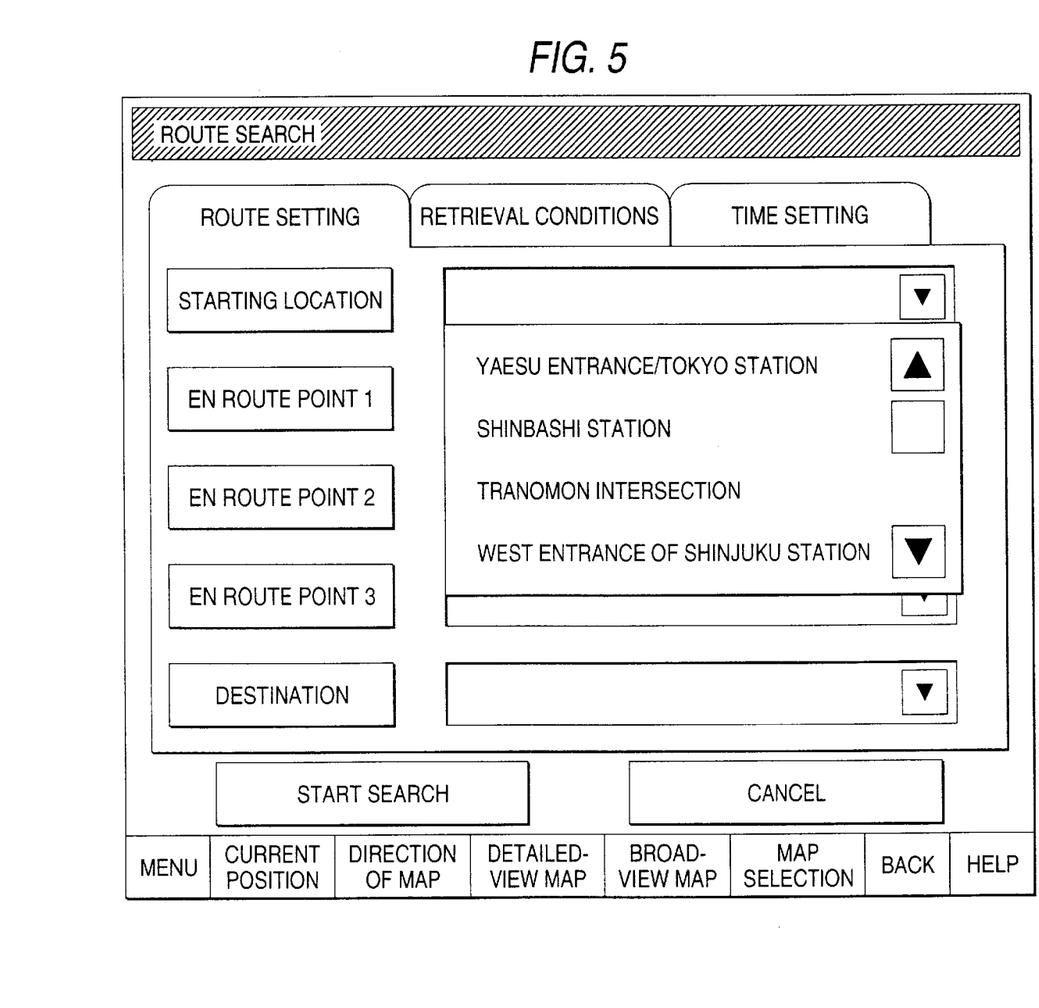
FIG. 5 is an illustration showing an example history list display screen within the route setting screen shown in FIG. 4.

The display section 4 displays (S301) a setting screen such as that shown in FIG. 4. When the driver clicks a desired one from items, such as a starting location and en route points, a list box appears (S302). For instance, in a case where the driver desires to set a starting location, the driver clicks a starting location, and a list box, such as that shown in FIG. 5, appears. The history of locations which have been entered in the past appears in the list box. As shown in FIG. 5, the list box shows a history of locations; for example, Yaesu Entrance of Tokyo Station, Shinbashi Station, and Toranomon Intersection. Locations are deleted from the history list in order from the oldest history. Therefore, locations used most frequently will remain on the list and will have a high priority.

In a case where a location desired to be entered is included in the list box (S303), the location is selected (S304) from the list box, whereby setting of a starting location is finished.

If the location is not included in the list box (S303), a registration list appears (S305). If the location is registered in the registration list (S305), the location is automatically preserved in the history list (S306), and the location is selected (S304) from the registration list, thus finishing a setting operation.

If the location is not registered in the registration list (S305), the location is searched by another retrieval method, such as a map search method, an address search method, or a name search method (S307). If this location is desired to be registered in the registration list (S308), a registration operation is performed (S309), and the thus-registered location is automatically preserved in the history list (S306). If registration of the location in the registration list is not desired (S308), the location is automatically preserved in the history list (S306) without performing a registration operation (S309). Once the location is automatically preserved in the history list, the location is selected (S304), thus finishing a setting operation.

Similar setting operations are performed to set en route points and a destination, whereupon entry of route setting information is completed.

As mentioned above, because locations which have been entered in the past are preserved in the history list, a location which is less frequently used can be selected from a history list without the user having to register the location in the registration list. A location quickly can be entered without performing a burdensome retrieval operation, such as a map retrieval operation or a name retrieval operation.

Assignment of a weight to each of straight-ahead travel, a right turn, a left turn, and a U-turn performed by the route setting device 21 will next be described.

Figure 6:
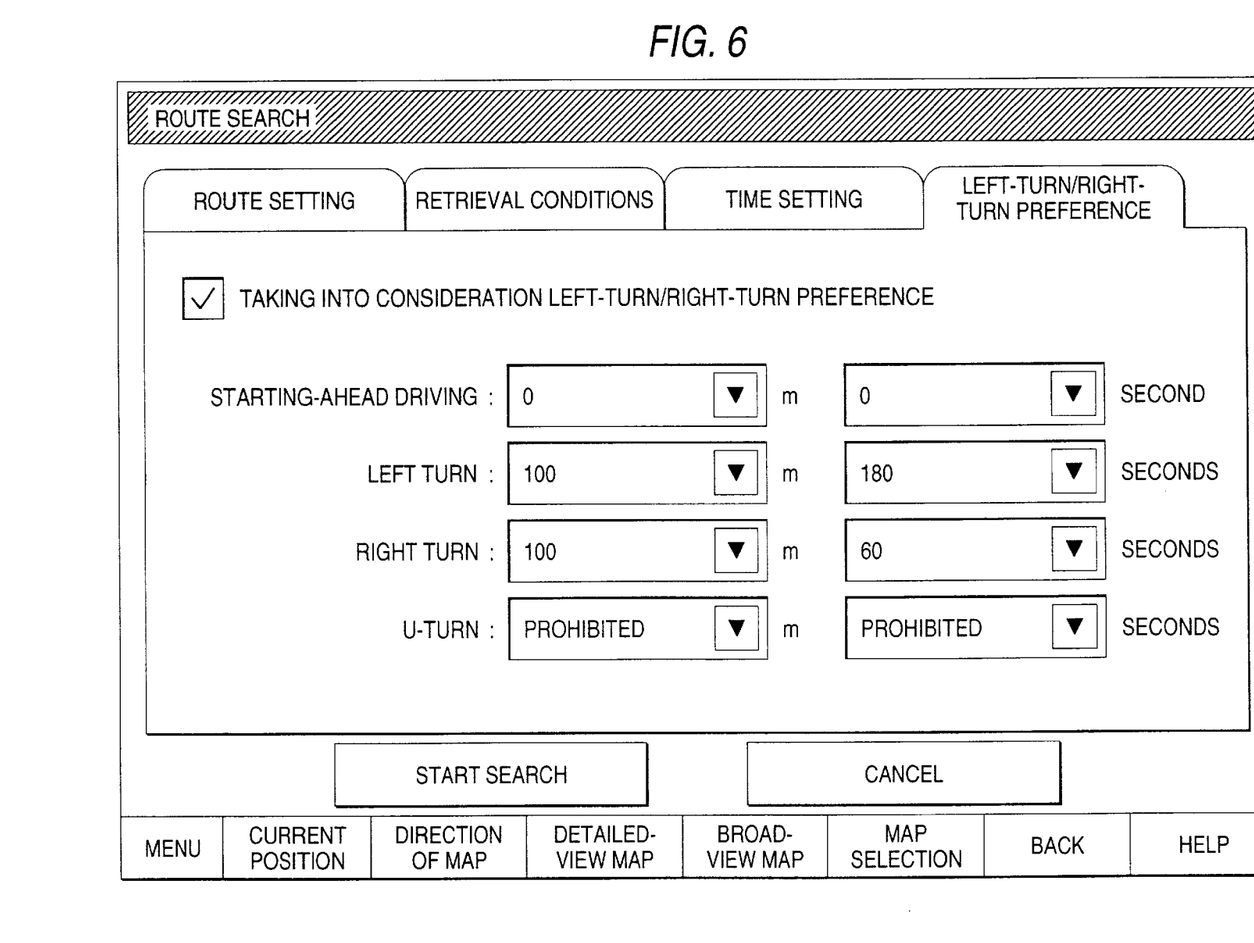
FIG. 6 is an illustration showing an example of right-turn/left-turn preference setting screen of the navigation system shown in FIG. 1.

A setting screen shown in FIG. 6 appears on the display section 4, and a driver enters a weight for each of straight-ahead travel, a right turn, a left turn, and a U-turn in accordance with the driver's preference. In the case of a distance-prioritized retrieval—i.e., when a route is selected by minimizing travel distance—there can be entered a numeric value, such as 0, 50, 100, 200, 300, 500, 700, 1000, and prohibition (m). In the case of a time-prioritized retrieval—i.e., when a route is selected by minimizing time traveled—there can be entered a numeric value, such as 0, 30, 60, 90, 120, 180, 240, 300, and prohibition (seconds). Thus, a weight can be assigned to each of straight-ahead travel, a right turn, a left turn, and a U-turn, thereby enabling a driver to set a route in accordance with his preference.

In the case of a distance-prioritized retrieval in the setting screen shown in FIG. 6, straight-ahead travel is not assigned a weight, and an identical weight is assigned to both a right turn and a left turn. Further, a U-turn is prohibited. Therefore, a route is retrieved by assigning priority to straight-ahead travel over right and left turns.

In the case of a time-prioritized retrieval, no weight is assigned to straight-ahead travel, and a weight assigned to a left turn is three times that assigned to a right turn. Further, a U-turn is prohibited. Therefore, a route is retrieved while assigning the highest priority to straight-ahead travel, the next highest priority to a right turn, and the lowest priority to a left turn.

Figure 7A:
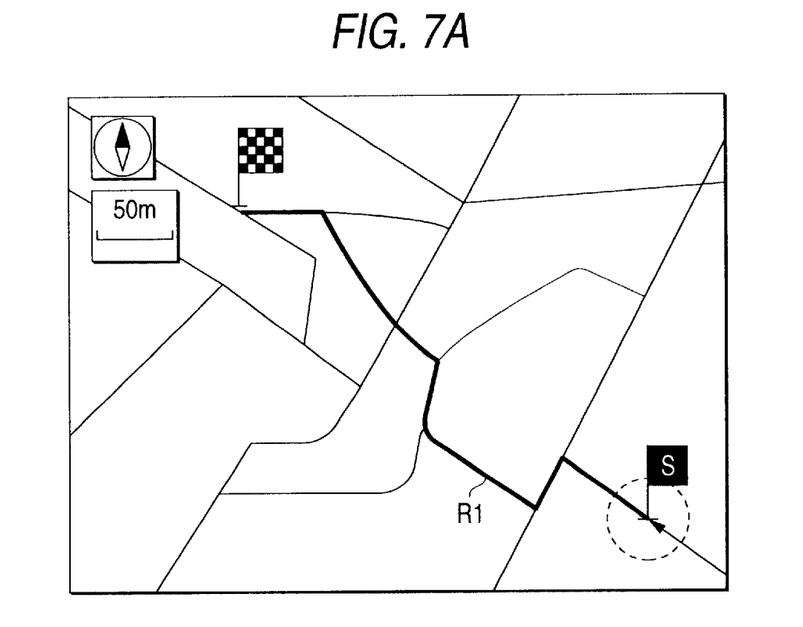
FIG. 7A is an illustration showing an example route retrieved when a right-turn/left-turn preference setting is not set in the right-turn/left-turn preference setting screen shown in FIG. 6.
Figure 7B:
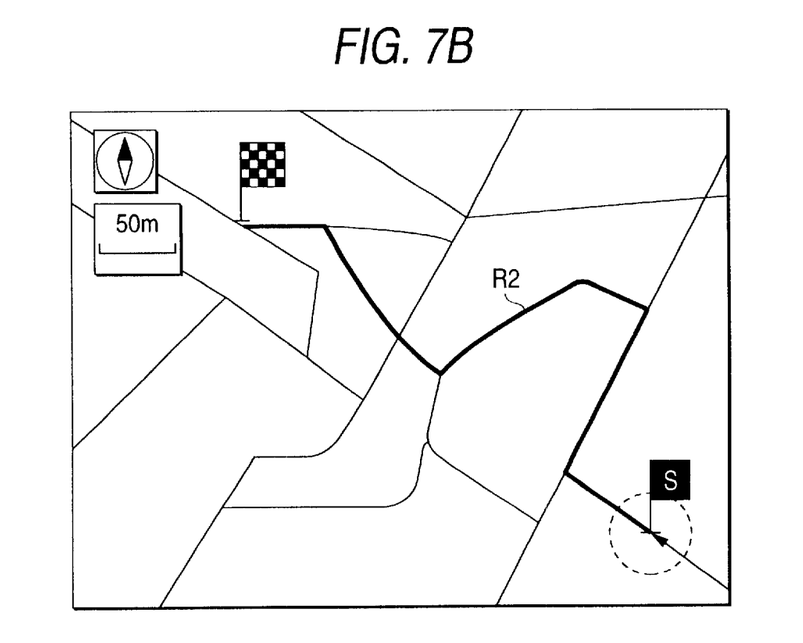
FIG. 7B is an illustration showing an example route retrieved when a right-turn/left-turn preference setting is set in the right-turn/left-turn preference setting screen shown in FIG. 6.

As a result, in a case where no settings are made, as shown in FIG. 7A, a route R1 is retrieved so as to attain the shortest distance. The route R1 involves two right turns and three left turns until the vehicle arrives at a destination. In contrast, in a case where a weight assigned to a left turn is three times that assigned to a right turn, as in the case of the time-prioritized retrieval shown in FIG. 6, the navigation system of the present embodiment retrieves a route R2 shown in FIG. 7B. The route R2 is longer in distance than the route R1 but involves two right turns and two left turns until the vehicle arrives at a destination. Consequently, the route R2 can eliminate one left turn.

A parallel parking setting of the route setting device 21 will now be described.

Figure 8:
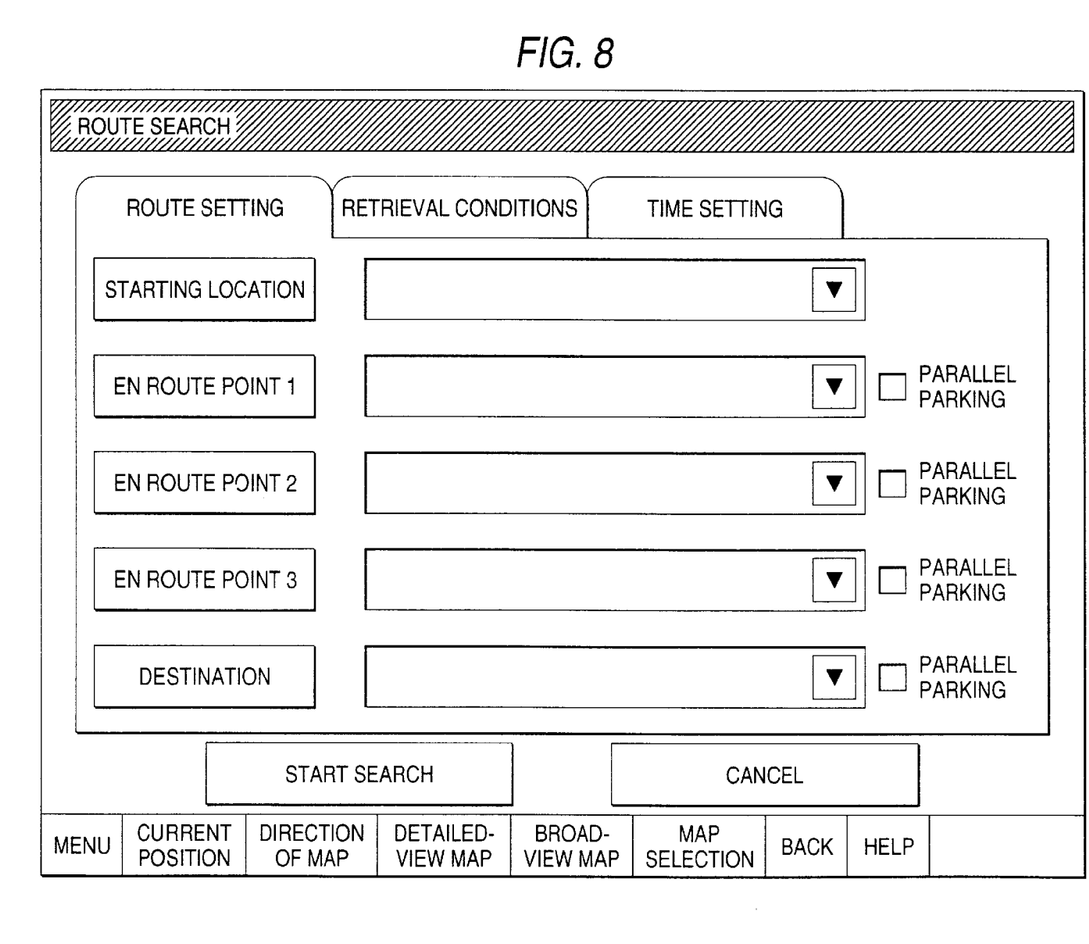
FIG. 8 is an illustration showing a parallel parking setting screen of the navigation system shown in FIG. 1.

The setting screen shown in FIG. 8 is displayed on the display section 4. In the setting screen, the driver selects one or more locations at which the driver desires to park his car parallel to a road, from among en route points and a destination. In connection with an en route point, in the case of left-side driving, the vehicle approaches an en route point such that the en route point is situated on the left side of the vehicle. In contrast, in the case of right-side driving, the vehicle approaches an en route point such that the en route point is situated on the right side of the vehicle.

Figure 9:
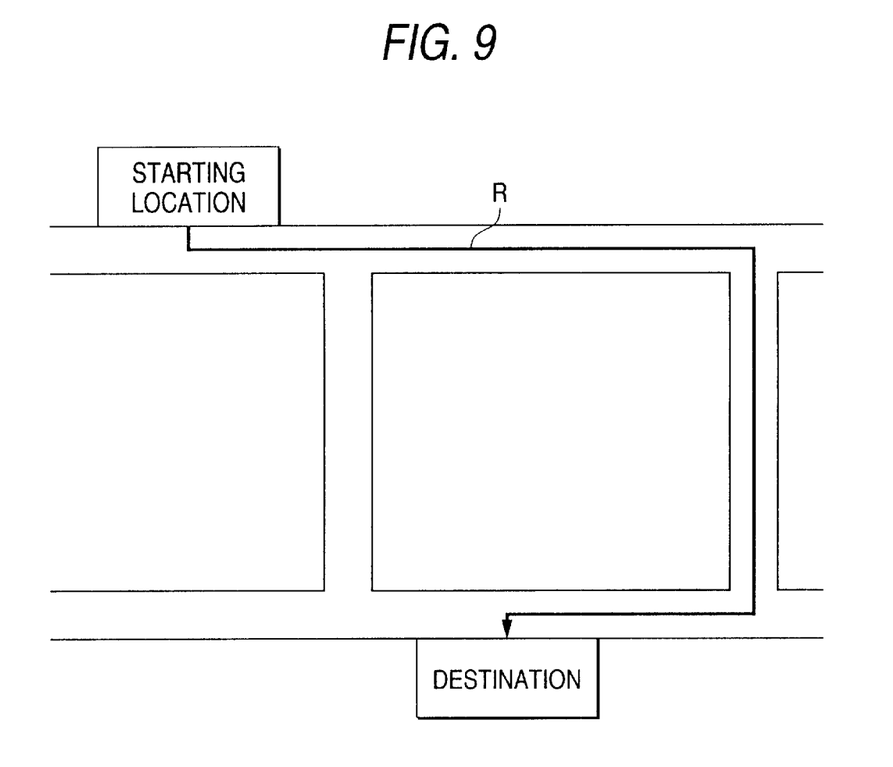
FIG. 9 is an example route retrieved when parallel parking is set in the parallel parking setting screen shown in FIG. 8.

Consequently, the navigation system retrieves a roundabout route R such as that shown in FIG. 9, so that the vehicle can approach the destination in a manner that the destination is situated on the left side of the road.

Figure 2:
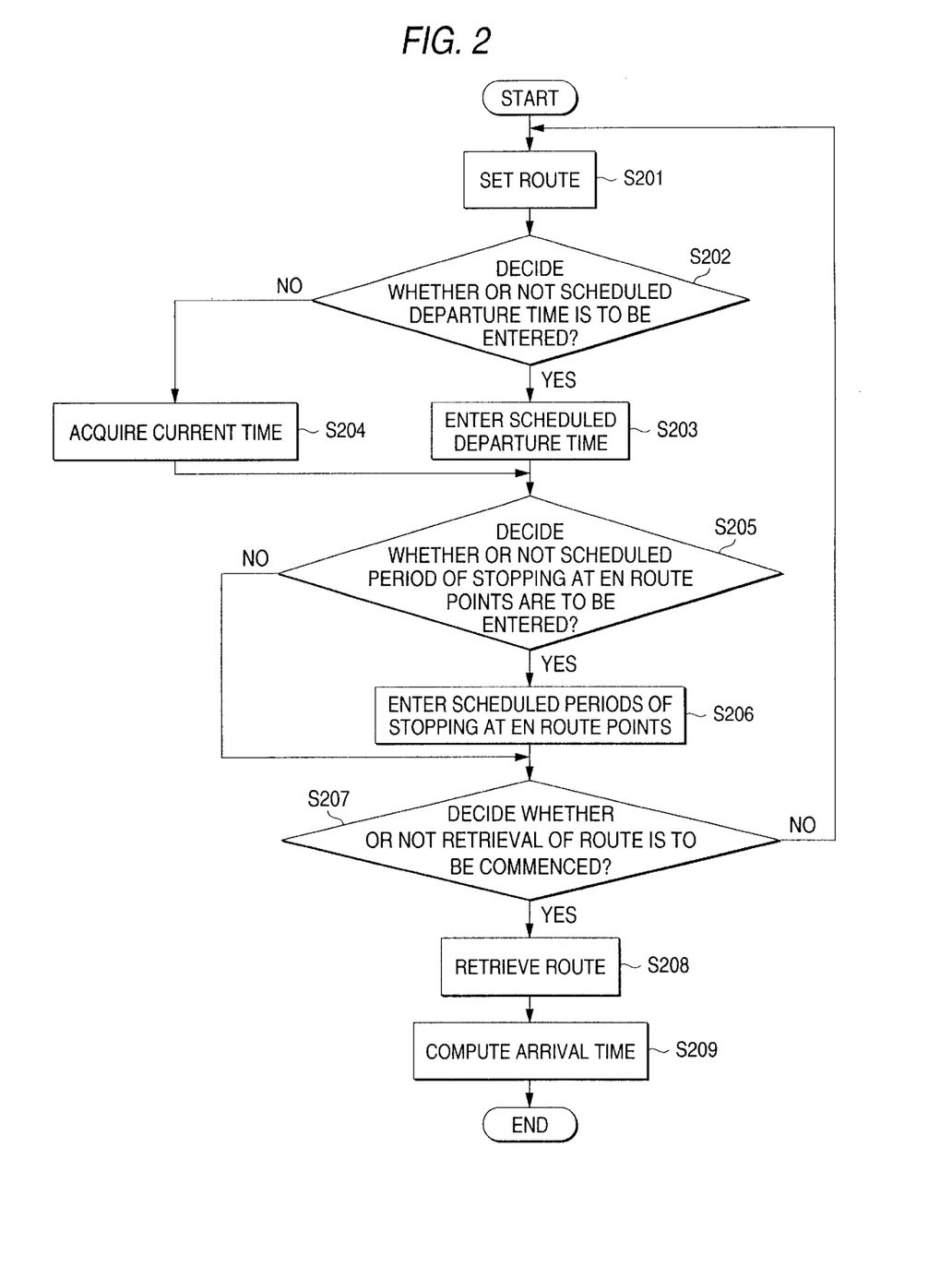
FIG. 2 is a flowchart for describing computation of an arrival time performed by the navigation system shown in FIG. 1.

Turning again to the flowchart shown in FIG. 2, setting of a route is finished in step S201. The driver determines whether to enter a scheduled departure time (S202). If the driver has determined to enter a scheduled departure time, the driver enters a scheduled departure time (S203). If the driver has determined not to enter a scheduled departure time, the time setting device 22 sets departure time as a current time (S204).

Next, the driver determines whether to enter a scheduled period of stopping at each of en route points (S205). If the driver has determined to enter a scheduled period of stopping, the driver enters a scheduled period of stopping at each of en route points, and the thus-entered scheduled periods of stopping are stored in the time setting device 22 (S206).

If a scheduled departure time, a current time, and scheduled periods of stopping at en route points are entered to the time setting device 22 and time settings are finished, the driver determines whether to start retrieval of a route (S207). The driver checks whether or not a destination, en route points, and a time setting are correct. If resetting is necessary, processing returns to step S201. In contrast, if the driver confirms that settings are correct, retrieval of a route is commenced. The route retrieval device 23 retrieves a route from a starting location to a destination by way of en route points (S208).

At this time, the route retrieval device 23 retrieves a route by prioritizing the routes which the driver has utilized in the past. To this end, the route retrieval device 23 preserves, in the map information storage section 8, a history of routes utilized in the past and the frequency of use of respective routes preserved in the history. That is, the route used most frequently is given the highest priority, the route used second-most frequently is given the second-highest priority, and so on for all the routes in the history. When the route retrieval device 23 retrieves a route, the route assigned the highest frequency of use, among those including the entered en route points and destination point, is retrieved from among the routes preserved in the history.

As a result, a route which the driver prefers—and one which satisfies the driver's desire—is retrieved. Thus, the driver is guided to drive the vehicle along the road which he uses everyday, thereby enabling him to drive safely.

The route retrieval device 23 retrieves a route so that the vehicle can be parked parallel to the en route point or destination for which parallel parking is set by the route setting device 21.

When retrieval of the route is finished, the arrival computation device 24 computes a time at which the vehicle is to arrive at the destination (S209). In consideration of the scheduled departure time and the scheduled periods of stopping at en route points entered to the time setting device 22, the arrival time computation device 24 computes an arrival time at which the vehicle will arrive at the destination on the assumption that the vehicle travels along the route retrieved by the route retrieval device 23.

As mentioned above, the arrival time computation device 24 computes an arrival time, by taking into account a scheduled departure time and scheduled periods of stopping. Even when the driver loads or unloads freight into and from the vehicle at each of the en route points, an accurate arrival time can be computed.

A program for executing processing operations of the vehicle-mounted navigation system can be preserved in a recording medium, such as a computer readable medium. When the recording medium is loaded into a computer system, the previously-described processing operations of the navigation system can be embodied while the computer is controlled by execution of the program. Here, the expression "recording medium" includes, for example, a memory device, a magnetic disk drive, an optical disk drive, and a device capable of recording a program.

As mentioned above, in connection with the vehicle-mounted navigation system according to the present invention and the recording medium having recorded thereon a processing program for the navigation system, an arrival time is computed by accounting for a scheduled departure time and a scheduled period of stopping. Even when a driver loads and unloads freight into and out of a vehicle at each of the en route points, a correct arrival time can be computed.

Since the locations which have been entered in the past are preserved in the history list, a location which is less frequently used can be selected from the history list, even though the location is not registered in a registration list. Consequently, a location can be input quickly without having to perform a troublesome retrieval operation such as a map retrieval operation or a name retrieval operation.

Since a driver can assign a weight to each of straight-ahead travel, a right turn, a left turn, and a U-turn in accordance with his preference, a route can be set in accordance with the driver's desire. Consequently, in a case where it is necessary to load or unload freight into or out of a commercial vehicle in a left-side driving environment, there can be avoided difficulty—in loading or unloading the freight—which would otherwise be caused when the vehicle approaches the destination such that the destination is situated on the right side of the vehicle. As a result, the driver can quickly arrive at the destination by way of the en route points.

At the time of retrieval of a route, a route which is very frequently used and, consequently, has been assigned the highest priority from among the routes preserved in the history, i.e., the highest priority among those having the entered en route and/or destination points, is retrieved. Accordingly, a route satisfying the driver's desire is retrieved.

What is claimed is:

1. A vehicle-mounted navigation system which detects a current position of a vehicle and retrieves a route to a set destination, thereby guiding the vehicle along the route, the system comprising:

a route setting device into which there is entered route setting information desired by a user, said route setting information including a starting location, a destination, and an en route point;

a time setting device into which there are entered a scheduled time at which the vehicle is to depart the starting location and a period of stopping at the en route point entered to the route setting device, wherein said time setting device sets departure time as a current time if the department time is not entered;

a route retrieval device which retrieves a route, to the destination, in accordance with the route setting information entered to the route setting device; and an arrival time computation device which computes a time, at which the vehicle is to arrive at the destination, on the basis of the route retrieved by the route retrieval device, and on the basis of the period of stopping and one of the scheduled departure time and the current time, entered to the time setting device;

wherein the route retrieval device preserves at least one route previously utilized by the user as a route history list, prioritizes the at least one route previously utilized by the user in the order of frequency with which the at least one route is used, and retrieves a route having the highest priority from the at least one route preserved in the route history list having the same destination as that entered by the user.

2. The vehicle-mounted navigation system as defined in claim 1, wherein the route retrieval device retrieves a route having the highest priority from the at least one route preserved in the route history list having the same en route point as that entered by the user.

3. A vehicle-mounted navigation system which detects a current position of a vehicle and retrieves a route to a set destination, thereby guiding the vehicle along the route, the system comprising:

a route setting device into which there is entered route setting information desired by a user, said route setting information including a starting location, a destination, and an en route point;

a time setting device into which there are entered a scheduled time at which the vehicle is to depart the starting location and a period of stopping at the en route point entered to the route setting device, wherein said time setting device sets departure time as a current time if the department time is not entered;

a route retrieval device which retrieves a route, to the destination, in accordance with the route setting information entered to the route setting device; and an arrival time computation device which computes a time, at which the vehicle is to arrive at the destination, on the basis of the route retrieved by the route retrieval device, and on the basis of the period of stopping and one of the scheduled departure time and the current time, entered to the time setting device;

wherein the route retrieval device preserves at least one route previously utilized by the user as a route history list, prioritizes the at least one route previously utilized by the user in the order of frequency with which the at least one route is used, and retrieves a route having the highest priority from the at least one route preserved in the route history list having the same en route point as that entered by the user.

4. A vehicle-mounted navigation system which detects a current position of a vehicle and retrieves a route to a set destination, thereby guiding the vehicle along the route, the system comprising:

a route setting device into which there is entered route setting information desired by a user, said route setting information including a starting location, a destination, an en route point, and at least one of a direction in which the vehicle is to approach the destination and a direction in which the vehicle is to approach the en route point; and a route retrieval device which retrieves a route to the destination on the basis of the route setting information entered to the route setting device such that the direction in which the vehicle is to approach at least one of the destination and the en route point matches an approach direction set by the user.

5. The vehicle-mounted navigation system as defined in claim 4, wherein in the case of left-side driving the route retrieval device retrieves a route such that at least one of the destination and the en route point is situated on the left side of the vehicle when the vehicle approaches the destination and the en route point, respectively.

6. The vehicle,mounted navigation system as defined in claim 4, where in the case of right-side driving the route retrieval device retrieves a route such that at least one of the destination and the en route point is situated on the right side of the vehicle when the vehicle approaches the destination and the en route point, respectively.

7. A computer readable medium having recorded thereon a processing program for use with a vehicle-mounted navigation system, which system detects a current position of a vehicle and retrieves a route to a set destination, thereby guiding the vehicle along the route, the program comprising:

a route setting operation for entering route setting information desired by a user, said route setting information including a starting location, a destination, and en route point;

a time setting operation for entering a time at which the vehicle is scheduled to depart the starting location, and for entering a period of stopping at the en route point entered in the route setting operation, and for setting as a departure time a current time if the departure time is not entered;

a route retrieval operation for retrieving a route, to the destination, in accordance with the route setting information entered to the route setting operation; and an arrival time computation operation for computing the time, at which the vehicle is to arrive at the destination, on the basis of the route retrieved by the route retrieval operation and on the basis of the period of stopping and one of the scheduled departure time and the current time, entered in the time setting operation;

wherein the route retrieval operation enables preservation of at least one route previously utilized by the user as a route history list, prioritizes the at least one route previously utilized by the user in the order of frequency with which the at least one route is used, and retrieves a route having the highest priority from the at least one route preserved in the route history list having the same destination as that entered by the user.

8. The computer readable medium as defined in claim 7, wherein the route retrieval operation retrieves a route having the highest priority from the at least one route preserved in the route history list having the same en route point as that entered by the user.

9. A computer readable medium having recorded thereon a processing program for use with a vehicle-mounted navigation system, which system detects a current position of a vehicle and retrieves a route to a set destination, thereby guiding the vehicle along the route, the program comprising:

a route setting operation for entering route setting information desired by a user, said route setting information including a starting location, a destination, and en route point;

a time setting operation for entering a time at which the vehicle is scheduled to depart the starting location, and for entering a period of stopping at the en route point entered in the route setting operation, and for setting as a departure time a current time if the departure time is not entered;

a route retrieval operation for retrieving a route, to the destination, in accordance with the route setting information entered to the route setting operation; and an arrival time computation operation for computing the time, at which the vehicle is to arrive at the destination, on the basis of the route retrieved by the route retrieval operation and on the basis of the period of stopping and one of the scheduled departure time and the current time, entered in the time setting operation;

wherein the route retrieval operation preserves at least one route previously utilized by the user as a route history list, prioritizes the at least one route previously utilized by the user in the order of frequency with which the at least one route is used, and retrieves a route having the highest priority from the at least one route preserved in the route history list having the same en route point as that entered by the user.

10. A computer readable medium having recorded thereon a processing program for use with a vehicle-mounted navigation system, which system detects a current position of a vehicle and retrieves a route to a set destination, thereby guiding the vehicle along the route, the program comprising:

a route setting operation for entering route setting information desired by a user, said route setting information including a starting location, a destination, an en route point, and at least one of a direction in which the vehicle is to approach the destination and a direction in which the vehicle is to approach the en route point; and a route retrieval operation for retrieving a route to the destination on the basis of the route setting information entered in the route setting operation such that the direction in which the vehicle is to approach at least one of the destination and the en route point matches an approach direction set by the user.

11. The computer readable medium as defined in claim 10, where in the case of left-side driving the route retrieval operation enables retrieval of a route such that at least one of the destination and the en route point is situated on the left side of the vehicle when the vehicle approaches the destination and one of the en route point, respectively.

12. The computer readable medium as defined in claim 10, where in the case of right-side driving the route retrieval operation enables retrieval of a route such that at least one of the destination and the en route point is situated on the right side of the vehicle when the vehicle approaches the destination and one of the en route points, respectively.

* * * * *